United States Patent [19]

Ugai et al.

[11] Patent Number: 5,739,201
[45] Date of Patent: Apr. 14, 1998

[54] TWO-PACK CROSSLINKING AQUEOUS ADHESIVE

[75] Inventors: Masaki Ugai, Osaka; Kiyoshi Nakayama, Nakakoma-gun; Masahito Mori, Takatsuki, all of Japan

[73] Assignee: Sunstar Giken Kabushiki Kaisha, Takatsuki, Japan

[21] Appl. No.: 795,309

[22] Filed: Feb. 4, 1997

Related U.S. Application Data

[63] Continuation of Ser. No. 369,652, Jan. 6, 1995, abandoned.
[51] Int. Cl.[6] ............................................. C08L 83/00
[52] U.S. Cl. ............................................. 524/506
[58] Field of Search ............................................. 524/506

[56] References Cited

U.S. PATENT DOCUMENTS

| | | | |
|---|---|---|---|
| 4,206,299 | 6/1980 | Yamazaki | 528/288 |
| 4,378,250 | 3/1983 | Treadway | 106/287.11 |

FOREIGN PATENT DOCUMENTS

| | | |
|---|---|---|
| 0215518 | 9/1986 | European Pat. Off. . |
| 0318192 | 11/1988 | European Pat. Off. . |
| 0544569A1 | 11/1992 | European Pat. Off. . |
| 2432006A1 | 7/1974 | Germany . |
| 4114923A1 | 5/1991 | Germany . |
| 3-064305 | 3/1991 | Japan . |

*Primary Examiner*—Melvyn I. Marquis
*Attorney, Agent, or Firm*—Jacobson, Price, Holman & Stern, PLLC

[57] ABSTRACT

A two-pack, crosslinking aqueous adhesive, which comprises (A) an adhesive component comprising an aqueous liquid of a polymer containing at least one of a halogen atom, a carboxyl group or an ester bond in the backbone chain or side chain of the polymer molecule and (B) a curing component comprising an active silyl compound containing at least one of an amino group or an imino group in the molecule, which has excellent emulsion stability after mixing the components, long pot-life and excellent heat resistance and is suitable for adhesion of materials which require heat resistance such as interior automotive trims.

4 Claims, No Drawings

TWO-PACK CROSSLINKING AQUEOUS ADHESIVE

This application is a continuation of application Ser. No. 08/369,652, filed on Jan. 6, 1995 now abandoned.

TECHNICAL FIELD

This invention relates to a two-pack, crosslinking aqueous adhesive, more particularly, to a two-pack type aqueous adhesive which can be cured by crosslinking reaction of an adhesive component and a curing component, wherein said adhesive component comprising an aqueous liquid of a polymer containing at least one of a halogen atom, a carboxyl group or an ester bond in the backbone chain or side chain of the polymer molecule and said curing component comprising an active silyl compound containing at least one of an amino group or an imino group in the molecule. The aqueous adhesive has excellent properties, such as high emulsion stability after mixing of the adhesive component and the curing component, long pot-life, and excellent heat resistance after curing.

PRIOR ART

The adhesives used for molding and processing of interior automotive trims are usually required to have good heat resistance. Accordingly, for such a purpose, there are usually used a two-pack, organic solution type adhesive comprising a urethane or chloroprene adhesive component and a curing component comprising a polyisocyanate compound. However, such a conventional two-pack, organic solution type adhesive contains an organic solvent for the adhesive component which causes environmental pollution. In view of such a problem, it is required to develop an aqueous adhesive which contains no or little organic solvent.

Accordingly, it has been tried to use a two-pack aqueous adhesive which comprises an adhesive component comprising an aqueous urethane or epoxy emulsion in combination with a curing component comprising a polyisocyanate compound, a melamine resin, a carbodiimide, an aziridine, or a metal oxide, etc. However, when a polyisocyanate compound is used as the curing agent for the aqueous adhesive which is crosslinkable at room temperature, the adhesive has some defects. For example, when the adhesive component and the curing component are mixed, the resulting mixture shows inferior emulsion stability, and further, it shows shorter pot-life owing to the high reactivity of the isocyanate group contained in the curing component.

BRIEF DESCRIPTION OF THE INVENTION

The present inventors have intensively studied to find an improved two-pack, crosslinking aqueous adhesive which has excellent stability after mixing the both components, long pot-life and excellent heat resistance after curing, and have found that the desired aqueous adhesive can be obtained by combination of an adhesive component comprising an aqueous liquid of a polymer having a specific reactive group and a curing component comprising a specific active silyl compound.

An object of the invention is to provide a two-pack, crosslinking aqueous adhesive which shows excellent emulsion stability after mixing of both components, long pot-life and also excellent heat resistance after curing. Another object of the invention is to provide an adhesive using no or little organic solvent which causes undesirable environmental pollution. A further object of the invention is to provide a two-pack, crosslinking aqueous adhesive which comprises an adhesive component comprising an aqueous liquid of a polymer containing a functional group and a curing component comprising a specific active silyl compound. These and other objects and advantages of the invention will be apparent to those skilled in the art from the following description.

DETAILED DESCRIPTION OF THE INVENTION

The two-pack, crosslinking aqueous adhesive of this invention comprises (A) an adhesive component comprising an aqueous liquid, particularly an aqueous emulsion, of a polymer containing at least one of a halogen atom, a carboxyl group or an ester bond in the backbone chain or side chain of the polymer molecule and (B) a curing component comprising an active silyl compound containing at least one of an amino group or an imino group in the molecule.

In the description and claims, the term "aqueous liquid" means both of an aqueous solution and an aqueous emulsion.

The adhesive component (A) comprises an aqueous liquid of a polymer, particularly an aqueous emulsion of a polymer. The aqueous liquid of a polymer includes, for example, an aqueous solution or emulsion of a polymer containing a halogen atom in the backbone chain of the polymer molecule; an aqueous solution or emulsion of a polymer containing a carboxyl group in the backbone chain or side chain of the polymer molecule; and an aqueous solution or emulsion of a polymer containing an ester bond in the side chain of the polymer molecule.

Suitable examples of the aqueous solution or emulsion of a polymer containing a halogen atom in the backbone chain of the polymer molecule are, for example, an aqueous emulsion of a chlorinated polypropylene [which is prepared by mixing a solution of a chlorinated polypropylene (chlorination degree: 10–50% by weight) in an organic solvent with water, emulsifying the mixture and thereafter removing the organic solvent], an aqueous emulsion of a chlorinated polyethylene, an aqueous emulsion of a chloroprene, or an aqueous emulsion of a chlorinated ethylene-vinyl acetate copolymer (e.g. ethylene-vinyl acetate-vinyl chloride copolymer), and the like.

Suitable examples of the aqueous solution or emulsion of a polymer containing a carboxyl group in the backbone chain or side chain of the polymer molecule are, for example, an aqueous emulsion of a copolymer of a copolymerizable unsaturated monomer (e.g. ethylene, vinyl acetate, chloroprene, styrene, or butadiene) and a copolymerizable monomer containing a carboxyl group (e.g. acrylic acid, methacrylic acid, or maleic anhydride). The emulsion may also be prepared by oxidizing an ethylene-vinyl acetate emulsion or latex, a chloroprene emulsion or latex, a styrene-butadiene emulsion or latex, or an acrylic emulsion or latex, by which the carboxyl group is introduced into the chain of the polymer. The aqueous liquid includes also an aqueous solution or emulsion of a carboxyl group-containing polymer (e.g. a carboxyl-containing polyester, a carboxyl-containing urethane, a carboxyl-containing polypropylene, or a carboxyl-containing polyethylene).

Suitable examples of the aqueous solution or emulsion of a polymer containing an ester bond in the side chain of the polymer molecule are, for example, polymer emulsions prepared by emulsion copolymerization of copolymerizable monomers, such as acrylic esters (e.g. methyl acrylate, ethyl acrylate, butyl acrylate, 2-ethylhexyl acrylate, 2-hydroxyethyl acrylate, 2-hydroxypropyl acrylate, etc.), methacrylic esters (e.g. methyl methacrylate, butyl methacrylate, benzyl methacrylate, 2-hydroxyethyl methacrylate, 2-hydroxypropyl methacrylate, etc.), and are specifically an ethylene-vinyl acetate emulsion, an acrylic emulsion, a styrene-butadiene rubber (SBR) emulsion, etc.

The adhesive component (A) may optionally contain, in addition to the above aqueous liquid of a polymer, various other conventional emulsions or latexes, water-soluble polyurethane, tackifying resin emulsions or latexes, and further antioxidants, film-forming agents, thickening agents, antifreezing agents, antiseptic agents, pigments and dyes, and the like. When the adhesive component (A) contains other components as mentioned above in addition to the main aqueous liquid of a polymer, the aqueous liquid of a polymer shall be contained in an amount of at least 20% by weight, preferably more than 50% by weight, based on the whole weight of the adhesive component (A) [the weight being as solid]. When the aqueous liquid of a polymer is contained in less than 20% by weight, the resulting adhesive does not show the desired heat resistance.

The active silyl compound used as the curing component (B) includes active silyl compounds containing at least one of an amino group and an imino group in the molecule, in other words, aminosilane compounds having a primary amino group, and iminosilane compounds which are prepared by blocking the primary amino group of the aminosilane compounds with a carbonyl compound.

The aminosilane compounds having a primary amino group include the compounds of the formula:

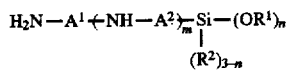

wherein $A^1$ and $A^2$ are the same or different and are each a divalent straight chain or branched chain, aliphatic hydrocarbon having 1 to 10 carbon atoms which may be intervened with one or two phenylene groups, $R^1$ is an alkyl group having 1 to 5 carbon atoms, such as methyl, ethyl, propyl, butyl, or pentyl, $R^2$ is an alkyl group having 1 to 5 carbon atoms, such as methyl, ethyl, propyl, butyl, or pentyl, m is an integer of 0 to 2, and n is an integer of 1 to 3.

Suitable examples of the aminosilane compounds having a primary amino group are the compounds where m is 0, such as aminomethyl-trimethoxysilane, aminomethyl-triethoxysilane, aminomethyl-dimethylmethoxysilane, aminomethyl-methyldimethoxysilane, aminomethyl-diethylmethoxysilane, aminomethyl-ethyldimethoxysilane, 2-aminoethyl-trimethoxysilane, 2-aminoethyl-triethoxysilane, 2-aminoethyl-methyldimethoxysilane, 2-aminoethyl-dimethylmethoxysilane, 3-aminopropyl-methyldiethoxysilane, 3-aminopropyl-dimethylethoxysilane, 3-aminopropyl-triethoxysilane, 3-aminopropyl-trimethoxysilane, 3-aminopropyl-methyldimethoxysilane, 3-aminopropyl-dimethylmethoxysilane, 4-aminobutyl-trimethoxysilane, 4-aminobutyl-methyldimethoxysilane, 5-aminopentyl-trimethoxysilane, and 3-amino-2-methylpropyl-trimethoxysilane; the compounds where m is 1, such as N-aminomethyl-aminomethyl-trimethoxysilane, N-aminomethyl-aminomethyl-methyldimethoxysilane, N-aminomethyl-aminomethyl-ethyldimethoxysilane, N-aminomethyl-aminomethyl-dimethylmethoxysilane, N-aminomethyl-aminomethyl-diethylmethoxysilane, N-(2-aminoethyl)-aminomethyl-trimethoxysilane, N-(2-aminoethyl)-2-aminoethyl-trimethoxysilane, N-(2-aminoethyl)-4-aminobutyl-trimethoxysilane, N-(3-aminopropyl)-aminomethyl-trimethoxysilane, N-(3-aminopropyl)-2-aminoethyl-trimethoxysilane, N-(2-aminoethyl)-3-aminopropyl-trimethoxysilane, N-(2-aminoethyl)-3-aminopropyl-methyldimethoxysilane, and N-(3-aminopropyl)-4-aminobutyl-trimethoxysilane; and the compounds where $A^1$ contains a phenylene, such as $H_2N—(CH_2)_2—$

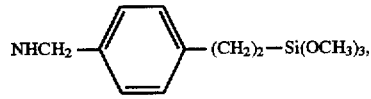

and

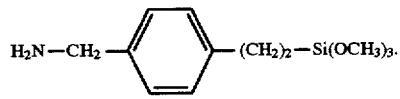

The iminosilane compounds are prepared by blocking the primary amino group of the aminosilane compounds as mentioned above with a carbonyl compound under the conditions as used in conventional dehydration condensation reaction, for example, by reacting the amino silane compound and the carbonyl compound in the presence of a dehydrating agent or with distilling off the produced water at reflux temperature. More specifically, the iminosilane compounds are prepared by reacting an aminosilane compound containing a primary amino group with a stoichiometrically equivalent amount of a carbonyl compound with stirring in the presence of a dehydrating agent (e.g. molecular sieves, anhydrous magnesium sulfate) at room temperature or with heating. The reaction may optionally be done in an appropriate organic solvent (e.g. toluene, xylene, or benzene).

The carbonyl compound used in the above reaction includes dicarbonyl compounds such as ethyl pyruvate, ethyl acetylpyruvate, dimethyl maleate, acetylacetone, $C_{1-C_5}$ alkyl acetoacetate (e.g. methyl acetoacetate, ethyl acetoacetate), dimethyl malonate, diethyl malonate, methyl ethyl malonate, and dibenzoylmethane; aldehydes such as acetaldehyde, propionaldehyde, n-butyraldehyde, isobutyraldehyde, diethylacetaldehyde, glyoxal, and benzaldehyde; cyclic ketones such as cyclopentanone, trimethylcyclopentanone, cyclohexanone, and trimethylcyclohexanone; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone, and diisobutyl ketone.

The aminosilane compounds and iminosilane compounds may be used alone or in combination of two or more thereof.

The curing component (B) is usually used in an amount of 1 to 20 % by weight to the adhesive component (A), that is, 1 to 20 parts by weight to 100 parts by weight of the adhesive component (A) [the weight being as solid]. When the amount of the curing component is less than 1% by weight, the curing component can not exhibit its function and causes problems such as inferior heat resistance in the final adhesive product, and on the other hand, when the amount is over 20% by weight, the adhesive tends to show disadvantageously shorter pot-life. The curing component may optionally contain other silyl compound containing no amino or imino group in the molecule (e.g. methyltriethoxysilane, vinyltrimethoxysilane) or a curing catalyst (e.g. tertiary amines).

The two-pack, crosslinking aqueous adhesive of this invention comprises two components of the adhesive component comprising the above-mentioned aqueous solution or emulsion of a specific polymer, and a curing component, and these adhesive component and curing component are weighed and mixed just before the use. If necessary, the adhesive component may be adjusted to a viscosity of 1,000 to 5,000 cps at 20° C. by adding thereto a thickening agent.

The adhesive of the invention is cured by cross-linking reaction of the aqueous liquid adhesive component and the curing component. Although the mechanism of said cross-linking reaction is not necessarily clarified, in case of using a liquid of a polymer containing a halogen atom (e.g. Cl), a polymer containing a carboxyl group, and a polymer containing an ester bond, the crosslinking may be effected by the following mechanism, respectively.

In case of a liquid of halogen (Cl)-containing polymer

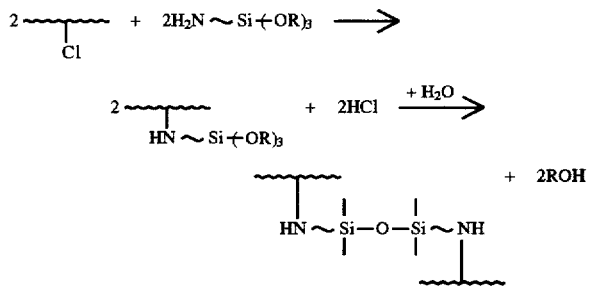

In case of a liquid of carboxyl-containing polymer

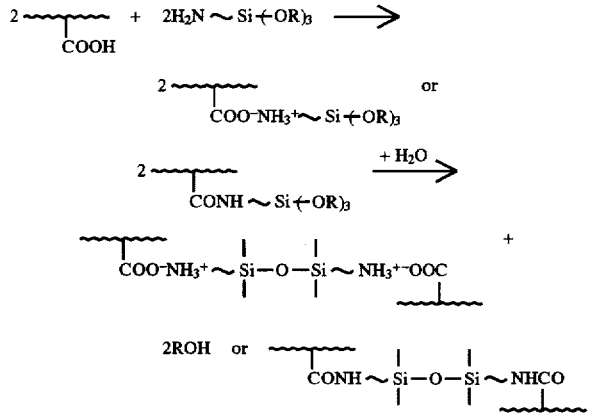

In case of a liquid of ester bond-containing polymer

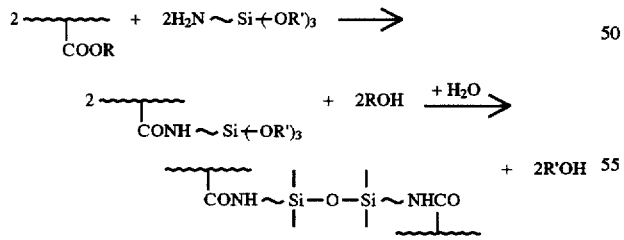

The aquoeus adhesive of this invention has sufficient heat resistance and further has excellent emulsion stability after mixing the components and a long pot-life. Besides, the aqueous adhesive can be used for the adhesion of any materials, such as plastic materials, wooden materials, metallic materials, and is particularly useful for the adhesion of polyolefin foams having a low porality.

EXAMPLES

This invention is illustrated by the following examples and reference examples but should not be construed to be limited thereto.

EXAMPLES 1 TO 3 AND REFERENCE EXAMPLES 1 AND 2

(1) Adhesive Components

The adhesive components are prepared from the kinds and amounts of an urethane emulsion, an acrylic emulsion, a chlorinated polypropylene aqueous emulsion, and a thickening agent as shown in the following Table 1.

(2) Two-Pack, Crosslinking Aqueous Adhesives

The adhesive components as mentioned in the above (1) are incorporated with the kinds and amounts of the curing components as shown in Table 1 to give the aqueous adhesives.

(3) Adhesion Test

The aqueous adhesive prepared by mixing well the components as in the above (2) was sprayed onto a wooden fibrous board (manufactured by Mitsui Mold) in an amount of 100 g/m$^2$ with a spray gun, and the resulting board was dried at 80° C. for 3 minutes and to the board was piled a skin material made of a polyolefin foam and applied with a primer (chloroprene primer) (tradename: PPAM, manufactured by Toray Co.) which was previously heated at 150° C., followed by pressing under 1.0 kg/cm$^2$ for 15 seconds to give a specimen.

The specimen thus prepared was subjected to the following tests, and the results are shown in Table 1.

Initial Peel Strength

One hour after the piling and pressing of the skim material onto the board, the peel strength (kg/25 mm) of the specimen was measured.

Dry Peel Strength

After aging the specimen at 20° C., 65% of relative humidity for 168 hours, the peel strength (kg/25 mm) thereof was measured.

Heat Creep Resistance

After subjecting to the aging under the same conditions as mentioned above, a load (50 g/25 mm) was applied to one end of the skin material of the specimen at an angle of 90° in an atmosphere of 80° C.; and the peel length (mm) was measured after 24 hours. In Table 1, the term "MB" means material break (break of the skim material), and the term "AF" means interfacial failure.

(4) Measurement of Pot-Life

After mixing the adhesive component and the curing component, the mixture was allowed to stand at 40° C., and the period of time until the viscosity changed in the degree of 50% was measured.

|  | Examples | | | Ref. Ex. | |
| --- | --- | --- | --- | --- | --- |
|  | 1 | 2 | 3 | 1 | 2 |
| Adhesive components |  |  |  |  |  |
| Urethane emulsion *1 | 100 | 100 | 100 | 100 | 100 |
| Acrylic emulsion *2 | — | — | 100 | — | — |
| Chlorinated poly-propylene emulsion *3 | 50 | 25 | — | — | 25 |
| Thickening agent *4 | 0.1 | 0.1 | 0.1 | 0.1 | 0.1 |
| Curing components |  |  |  |  |  |
| Active silyl compd. *5 | 5 | 5 | 5 | 5 | — |
| Polyisocyanate *6 | — | — | — | — | 5 |

-continued

|  | Examples | | | Ref. Ex. | |
|---|---|---|---|---|---|
|  | 1 | 2 | 3 | 1 | 2 |
| compd. | | | | | |
| Peel strength (kg/25 mm) | | | | | |
| Initial | 2.5 MB | 2.5 MB | 2.5 MB | 2.0 MB/AF | 2.5 MB |
| Dry | 2.7 MB | 2.7 MB | 2.6 MB | 1.4 AF | 2.6 MB |
| Heat creep resistance | 0 | 0 | 0 | Fall | 0 |
| Pot-life (hour) | 8 | 8 | 8 | 8 | 2 |

[Notes]
*1 Dispacol 8464, solid component 40%, manufactured by Bayer
*2 Polytrone U-154, solid component 60%, manufactured by Asahi Chemical Ind. Co., Ltd.
*3 Hardrene 2A-011J, solid component 34.7%, Cl content 5.3%, manufactured by Toyo Kasei K.K.
*4 San Nopco A-814, manufactured by San Nopco K.K.
*5 γ-Aminopropylmethyldiethoxysilane, KBE-902, manufactured by Shin-Etsu Chemical Co., Ltd.
*6 Desmodur DA, manufactured by Bayer

EXAMPLE 4

(1) Preparation of an Iminosilane Compound

In a three-necked flask 2-ethylhexylaldehyde (128.31 g, 1 mole) and magnesium (50 g) are mixed and the mixture is cooled to 10° C. with stirring. And thereto is added dropwise 3-aminopropyltrimethoxysilane (89.7 g, 0.5 mole), during which the temperature of the mixture is kept below 20° C. After the addition, the mixture is kept at 20° C. for 5 hours, and the mixture is filtered to give an iminosilane compound.

(2) By using the above iminosilane compound as a curing component and the adhesive components as shown in Table 2, the adhesion test the same as in Examples 1 to 3 was carried out. The results are shown in Table 2.

TABLE 2

|  | Example 4 |
|---|---|
| Adhesive components | |
| Urethane emulsion *1 | 100 |
| Ethylene-vinyl acetate copolymer emulsion *2 | 100 |
| Chlorinated polypropylene emulsion *3 | 50 |
| Thickening agent *4 | 0.1 |
| Curing component | |
| The iminosilane compd. as prepared in Example 4-(1) | 10 |
| Peel strength (kg/25 mm) | |
| Initial | 2.5 MB |
| Dry | 2.6 MB |
| Heat creep resistance | 5 |
| Pot-life (hour) | 15 |

[Notes]
*1 Dispacol 8464, solid component 40%, manufactured by Bayer
*2 Kuraray Panflex OM-3300, manufactured by Kuraray Co., Ltd.
*3 Hardrene 2A-011J, solid component 34.7%, Cl content 5.3%, manufactured by Toyo Kasei K.K.
*4 San Nopco A-814, manufactured by San Nopco K.K.

What is claimed is:

1. A two-pack, crosslinking aqueous adhesive, which comprises:

(A) an adhesive component comprising an aqueous emulsion or latex of a polymer selected from the group consisting of:

(i) an aqueous emulsion or latex of a polymer containing a halogen atom in the backbone chain of the polymer molecule selected from (a) an aqueous emulsion of a chlorinated polypropylene or (b) an aqueous latex of a chloroprene;

(ii) an aqueous emulsion or latex of a polymer containing a carboxyl group in the backbone chain or side chain of the polymer molecule selected from (c) an aqueous emulsion of a copolymer of a copolymerizable monomer containing a carboxyl group selected from acrylic acid, methacrylic acid, or maleic anhydride, (d) an emulsion prepared by oxidizing an ethylene-vinyl acetate emulsion or latex, a chloroprene emulsion or latex, a styrene-butadiene emulsion or latex, or an acryl emulsion or latex, or (e) an aqueous emulsion of a carboxyl group-containing polymer selected from a carboxyl-containing polyester, a carboxyl-containing urethane, a carboxyl-containing polypropylene, or a carboxyl-containing polyethylene; and (iii) a mixture of these aqueous emulsions or latexes;

(B) a curing component comprising an iminosilane compound prepared by blocking, with a carbonyl compound, a primary amino group of an aminosilane compound of the formula

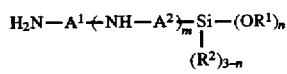

wherein $A^1$ and $A^2$ are the same or different and are each a divalent straight chain or branched chain, aliphatic hydrocarbon having 1 to 10 carbon atoms which may be intervened with one or two phenylene group, $R^1$ is an alkyl group having 1 to 5 carbon atoms, $R^2$ is an alkyl group having 1 to 5 carbon atoms, m is an integer of 0 to 2, and n is an integer of 1 to 3.

2. The aqueous adhesive according to claim 1, wherein the adhesive component (A) comprises a combination of:

(i) an aqueous emulsion or latex of a polymer containing a halogen atom in the backbone chain of the polymer molecule selected from (a) an aqueous emulsion of a chlorinated polypropylene or (b) an aqueous latex of a chloroprene;

(ii) an aqueous emulsion or latex of a polymer containing a carboxyl group in the backbone chain or side chain of the polymer molecule selected from (c) an aqueous emulsion of a copolymer of a copolymerizable monomer containing a carboxyl group selected from acrylic acid, methacrylic acid, or maleic anhydride, (d) an emulsion prepared by oxidizing an ethylene-vinyl acetate emulsion or latex, a chloroprene emulsion or latex, a styrene-butadiene emulsion or latex, or an acryl emulsion or latex, or (e) an aqueous emulsion of a carboxyl group-containing polymer selected from a carboxyl-containing polyester, a carboxyl-containing urethane, a carboxyl-containing polypropylene, or a carboxyl-containing polyethylene.

3. The aqueous adhesive according to claim 1, wherein the curing component (B) is incorporated in an amount of 1 to 20% by weight to the adhesive component (A).

4. The aqueous adhesive according to claim 1, wherein the adhesive component (A) comprises the aqueous liquid of a polymer in an amount of at least 20% by weight based on the whole weight of the adhesive component.

* * * * *